US009760865B2

(12) United States Patent
Jones et al.

(10) Patent No.: US 9,760,865 B2
(45) Date of Patent: Sep. 12, 2017

(54) MULTI-MODAL TRANSCRIPT UNIFICATION IN A COLLABORATIVE ENVIRONMENT

(75) Inventors: Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 11/839,944

(22) Filed: Aug. 16, 2007

(65) Prior Publication Data

US 2009/0049138 A1   Feb. 19, 2009

(51) Int. Cl.
*G06F 15/16* (2006.01)
*G06Q 10/10* (2012.01)
*H04L 12/58* (2006.01)
*H04L 12/18* (2006.01)

(52) U.S. Cl.
CPC ........... *G06Q 10/107* (2013.01); *H04L 51/04* (2013.01); *H04L 12/1831* (2013.01)

(58) Field of Classification Search
CPC ....... H04L 67/10; H04L 12/581; H04L 51/36; H04L 65/40; H04L 12/5895; H04L 51/04; H04L 12/5835; H04L 51/066; H04L 51/32; H04L 12/58; H04L 12/589; H04L 65/1016
USPC .................................................. 709/204–207
See application file for complete search history.

(56) References Cited

U.S. PATENT DOCUMENTS

| | | | |
|---|---|---|---|
| 6,757,732 B1* | 6/2004 | Sollee et al. | 709/227 |
| 7,769,144 B2* | 8/2010 | Yao | G06Q 10/107 379/88.11 |
| 2004/0186909 A1 | 9/2004 | Greenwood | |
| 2005/0020288 A1 | 1/2005 | Davis et al. | |
| 2005/0144247 A1* | 6/2005 | Christensen et al. | 709/207 |
| 2005/0197842 A1 | 9/2005 | Bergmann et al. | |
| 2005/0210394 A1* | 9/2005 | Crandall | H04L 12/1831 715/752 |
| 2006/0168315 A1* | 7/2006 | Daniell et al. | 709/237 |
| 2008/0037721 A1* | 2/2008 | Yao et al. | 379/88.11 |
| 2008/0056283 A1 | 3/2008 | Stephen et al. | |
| 2009/0003576 A1* | 1/2009 | Singh et al. | 379/202.01 |

* cited by examiner

*Primary Examiner* — Djenane Bayard
(74) *Attorney, Agent, or Firm* — Steven M. Greenberg, Esq.; CRGO Law

(57) ABSTRACT

Embodiments of the present invention address deficiencies of the art in respect to multi-modal chat logging management in a collaborative environment, and provide a novel and non-obvious method, system and apparatus for generating a unified chat transcript for a multi-modal conversation in an instant messaging session. In one embodiment of the invention, a method of generating a unified chat transcript for a multi-modal conversation in an instant messaging session can be provided. The method can include establishing concurrent voice messaging and text messaging sessions between two conversants, receiving both voice messages and text messages between two conversants through the voice messaging and instant messaging sessions, and logging the voice messages and text messages in a single transcript of conversation between the two conversants.

16 Claims, 3 Drawing Sheets

MULTI-MODAL TRANSCRIPT UNIFICATION IN A COLLABORATIVE ENVIRONMENT

BACKGROUND OF THE INVENTION

Field of the Invention

The present invention relates to the field of collaborative computing and more particularly to instant messaging in a collaborative computing environment.

Description of the Related Art

The recent rapid development of the Internet has led to advanced modes of synchronous, real-time collaboration able to fulfill the real-time communicative requirements of the modern computing participant. Using the Internet or a corporate intranet as a backbone, individuals worldwide can converge in real-time in cyberspace to share ideas, documents and images in a manner not previously possible through conventional telephony and video conferencing.

To facilitate collaboration over the Internet, a substantial collection of synchronous messaging technologies and protocols have been assembled to effectively deliver audio, video and data over the single data communications medium of the Internet. These synchronous messaging technologies include several, real-time human-to-human collaborative environments such as instant messaging and persistent chat rooms. The common messaging space can accommodate a pair of users to a chat, or multiple users to a conference. In some circumstances, the initiation of the chat can be spontaneous upon one user's recognizing the presence and availability of a partner user. In other circumstances, the initiation of the chat can be planned and can even subsist in a calendared event in a calendaring and scheduling system.

Amongst often used collaborative components in a collaborative environment, instant messaging remains of paramount importance. In instant messaging systems, users are provided with instant messaging client software, which allows them to communicate via an instant messaging server with other users. Although instant messaging systems allow users to communicate with each other in real-time, these existing instant messaging systems have several deficiencies with regard to automatically logging a chat transcript that contains multi-modal communication, such as text and voice in one conversation.

In this regard, when involved in a chat session, a user may converse with another user by providing a combination of text and audio messages in the chat session. Switching to voice chatting during a textual chat session can be preferred when chatting about a complex subject that may be too cumbersome to communicate by text alone. Once the chat session has ended, users may refer to a chat transcript for the conversation at any time. The chat transcript can include a textual chat log archive that displays the whole chat session in textual format based upon time-stamps. Necessarily, the chat transcript excludes any audio portion of the chat session. Rather, at best the audio portion of the chat session is stored separately from the chat transcript in an audio file.

BRIEF SUMMARY OF THE INVENTION

Embodiments of the present invention address deficiencies of the art in respect to multi-modal chat logging management, and provide a novel and non-obvious method, system and computer program product for generating a unified chat transcript for a multi-modal conversation in an instant messaging session. In one embodiment of the invention, a method of generating a unified chat transcript for a multi-modal conversation in an instant messaging session can include establishing concurrent voice messaging and text messaging sessions between two conversants, receiving both voice messages and text messages between two conversants through the voice messaging and instant messaging sessions respectively, and logging the voice messages and text messages in a single transcript of conversation between the two conversants.

In one aspect of the embodiment, the method can further include switching the conversation between the voice messaging session and the text messaging session. In another aspect of the embodiment, establishing concurrent voice messaging and text messaging sessions between two conversants can include activating voice messaging session from the text messaging session. In yet another aspect of the embodiment, logging the voice messages and text messages in a single transcript of conversation between the two conversants can include chronologically displaying the voice messages and the text messages in a single instant messaging session between the two conversants.

In even yet another aspect of the embodiment, logging the voice messages and text messages in a single transcript of conversation between the two conversants can include storing the voice messages and text messages in a single transcript log file between the two conversants. Finally, in even yet a further aspect of the embodiment, logging the voice messages and text messages in a single transcript of conversation between the two conversants further can include chronologically ordering the voice messages and the text messages in the single transcript.

In another embodiment of the invention, a collaborative computing data processing system can be provided. The system can include an instant messenger configured to maintain a multi-modal instant messaging session between first and second conversants, and multi-modal transcript unification logic comprising program code enable to establish concurrent voice messaging and text messaging sessions between two conversants, receive both voice messages and text messages between two conversants through the voice messaging and instant messaging sessions respectively, and log the voice messages and text messages in a single transcript of conversation between the two conversants.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for generating a unified chat transcript for a multi-modal conversation in an instant messaging session. In accordance with an embodiment of the present invention, an instant messaging session capable of text chat and voice chat can be established and maintained as between two conversants in a collaborative environment. When a conversant receives a voice message and a text message respectively, the voice and text messages can be logged into a single transcript of conversation that displays the chronological order of the voice and text messages.

Figure 1:
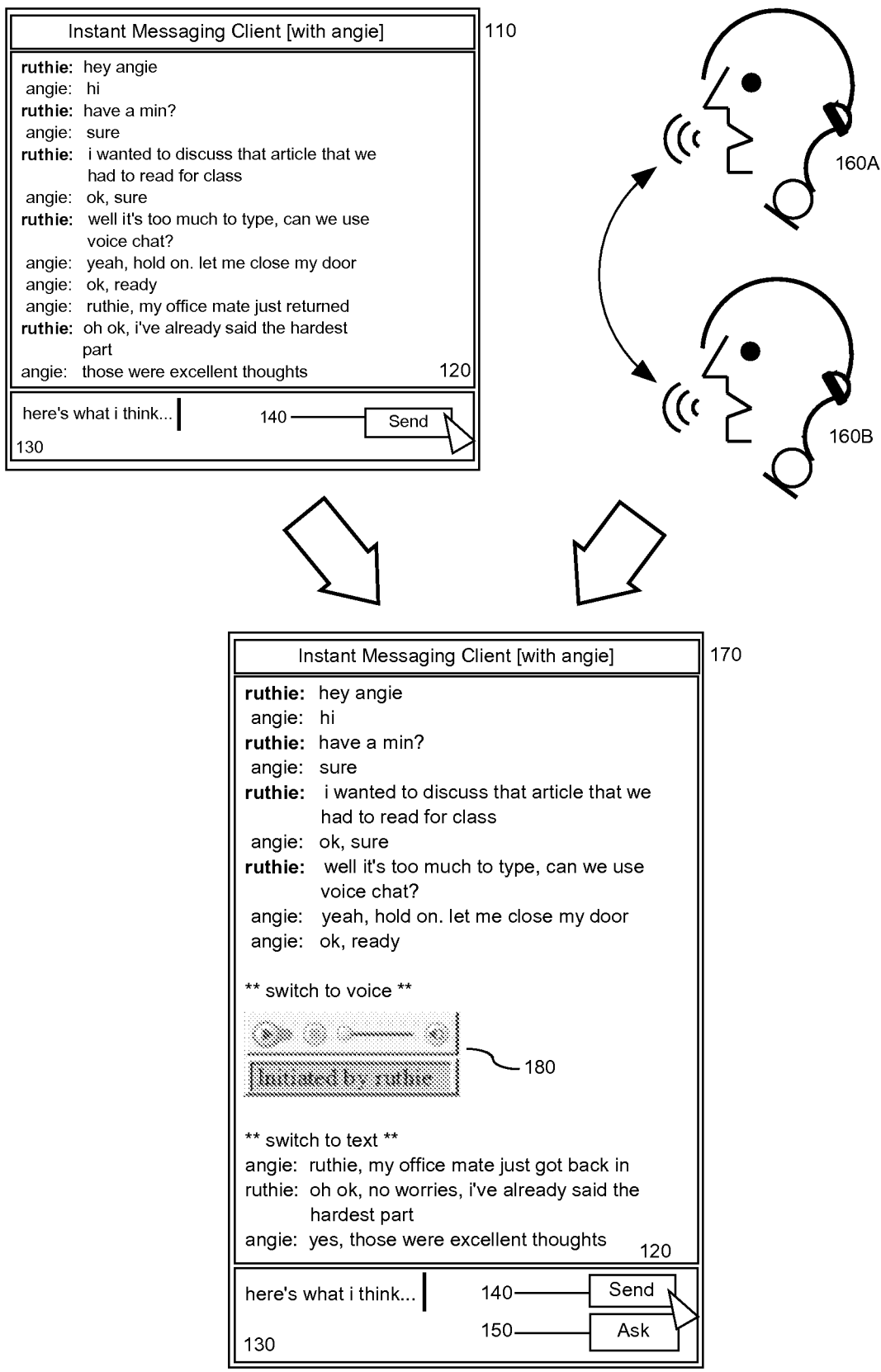
FIG. 1 is a pictorial illustration of an instant messenger configured for multi-modal transcript unification.

In further illustration, FIG. 1 is a pictorial illustration of an instant messenger configured for multi-modal transcript unification. As shown, an instant messaging client 110 can support an instant messaging session between two conversants. The instant messaging session can be represented within instant messaging chat transcript 120. Individual conversants to the instant messaging session can provide entries to the instant messaging chat transcript 120 through message entry field 130. Upon selecting a send control 140, content provided in the message entry field 130 can be added to the instant messaging chat transcript 120. Notably, voice messaging session between a first conversant 160A and a second conversant 160B can be implemented from within the instant messaging client 110.

To generate a unified chat transcript for a multi-modal conversation in the instant messaging chat transcript 120, concurrent voice messaging and text messaging sessions can be established in the instant messaging client 110 and each of the text messages and voice messages can be logged in a single chat transcript 170 displaying a chronological order, including an embedded voice message 180, along with text messages of conversation between the two conversants. Thus, reflecting not only when a conversant has switched from text message to voice message, but also making available the actual content of each voice message within a single transcript containing text and voice messages. Alternatively, once a conversation has ended, the voice messages and text messages can be stored in a single chat transcript log file for later reference.

Figure 2:
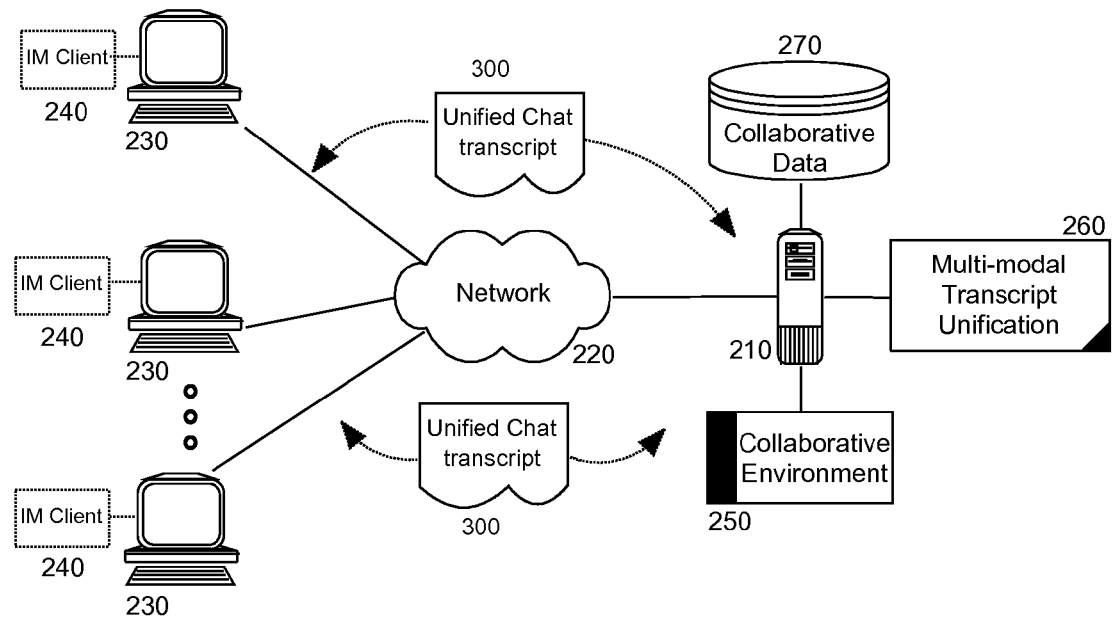
FIG. 2 is a schematic illustration of a collaborative computing data processing system configured for generating a unified chat transcript for a multi-modal conversation in an instant messaging session.

The multi-modal transcript unification process described herein can be embodied within a collaborative computing environment. In illustration, FIG. 2 is a schematic illustration of a collaborative computing data processing system configured for generating a unified chat transcript for a multi-modal conversation in an instant messaging session. The system can include a host server 210 configured for communicative coupling to one or more collaborative clients 230 over computer communications network 220. The host server 210 can support the operation of a collaborative environment 250 serving each of the collaborative clients 230 and managing collaborative data 270 for the collaborative clients 230.

Each of the collaborative clients 230 can provide a collaborative application 240. The collaborative application 240 can include, for example, an instant messenger, text chat component, voice chat component, and video chat component. It will be recognized by the skilled artisan, however, that any or all of the functional portions of the collaborative application 240 can be disposed in host server 210 as part of the collaborative environment 250 and provided to a lightweight client in collaborative client 230 such as a Web browser over the computer communications network 220.

Notably, multi-modal transcript logic 260 can be coupled to the collaborative environment 250 through host server 210. The logic 260 can include program code enabled to establish concurrent voice messaging and text messaging sessions between two conversants, receive both voice messages and text messages between two conversants through the voice messaging and instant messaging sessions respectively, and log the voice messages and text messages in a single transcript of conversation between the two conversants.

Figure 3:
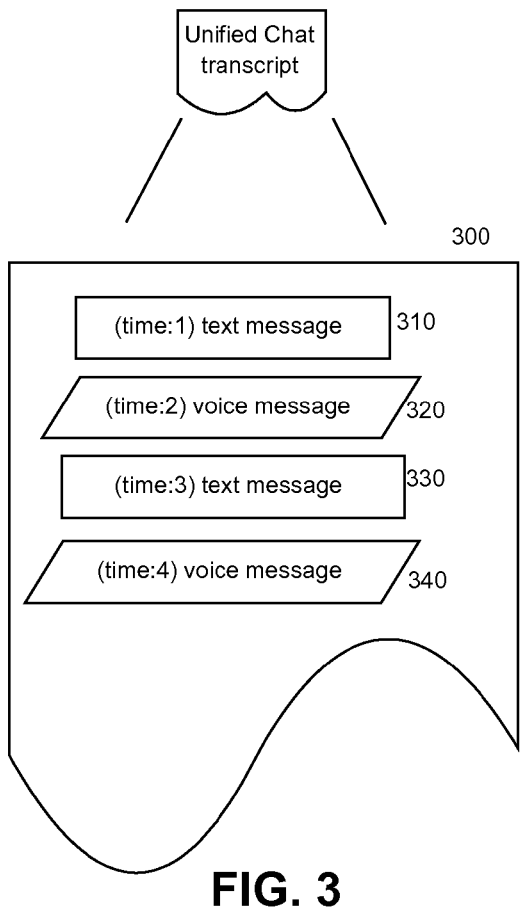
FIG. 3 is a block diagram of a unified chat transcript depicted in FIG. 2.

In yet further illustration, FIG. 3 is a block diagram of a unified chat transcript depicted in FIG. 2. Blocks 310 and 330 depict a text message within an instant messaging chat transcript 300. Block 320 and 340 depict voice messages that were received during a multi-modal conversation between two conversants. The order of displaying the voice and text messages can based on, for example, chronological order, or username order.

Figure 4:
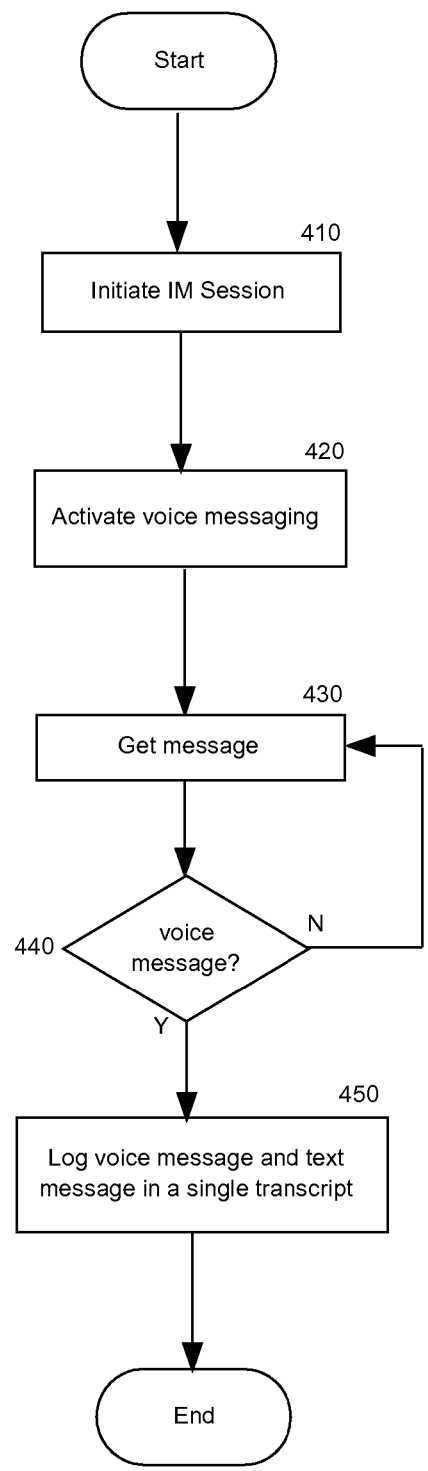
FIG. 4 is a flow chart illustrating a process for generating a unified chat transcript for a multi-modal conversation in an instant messaging session.

In yet further illustration of the operation of portions of the instant messaging multi-modal transcript logic 260, FIG. 4 is a flow chart illustrating a process for generating a unified transcript for a multi-modal conversation. Beginning in block 410, an instant messaging session can be initialized between at two conversants. Next in block 420 a voice messaging session can be activated. In block 430, a message within the instant messaging chat transcript can be retrieved. Since an instant message can contain multi-modal messages such as text messages or voice messages, each message entry can be classified. In decision block 440 if the message is a voice message then the voice message can be logged in chronological order along with text messages that have occurred between the two conversants. The voice messages and text messages can be logged into a single chat transcript, and additionally can be stored as a single chat transcript log file for future reference.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for generating a unified chat transcript for a multi-modal conversation in an instant messaging session, the method comprising:
    establishing a single instant messaging session between two conversants;
    receiving text messages as part of a conversation between the two conversants, through the single instant messaging session;
    embedding in the instant messaging session a voice message received from one of the two conversants;
    classifying each one of the embedded voice message and the received text messages by type, the type of message being one of a voice message and a text message;
    determining if the one of the voice and text messages is classified as a voice message; and,
    logging the classified voice and text messages in a single transcript of conversation between the two conversants occurring in the single instant messaging session in response to determining that the one of the received voice and text messages is classified as a voice message.

2. The method of claim 1, further comprising switching the conversation between voice messaging and the text messaging.

3. The method of claim 1, wherein the logging comprises chronologically displaying each one of the classified voice and text messages in the single instant messaging session between the two conversants.

4. The method of claim 1, wherein the logging comprises storing each one of the classified voice and text messages in a single transcript log file between the two conversants.

5. The method of claim 1, wherein the logging comprises chronologically ordering each one of the classified voice and text messages in the single transcript.

6. The method of claim 1, wherein the logging comprises displaying each one of the classified voice and text messages by username order in the single instant messaging session between the two conversants.

7. The method of claim 1, wherein the logging comprises username ordering of each one of the classified voice and text messages in the single transcript.

8. A collaborative computing data processing system comprising:
    a processor;
    an instant messenger configured to maintain a multi-modal instant messaging session between first and second conversants; and
    multi-modal transcript unification logic, executing on the processor, and configured to
        establish a single instant messaging session between two conversants,
        receive text messages as part of a conversation between the two conversants, through the single instant messaging session,
        embed in the instant messaging session a voice message received from one of the two conversants,
        classify each one of the embedded voice message and the received text messages by type, the type of message being one of a voice message and a text message,
        determine if the one of the voice and text messages is classified as a voice message, and
        log the classified voice and text messages in a single transcript of conversation between the two conversants occurring in the single instant messaging session in response to determining that the one of the voice and text messages is classified as a voice message.

9. The system of claim 8, wherein the multi-modal transcript unification logic is configured to couple the voice messaging session to the single instant messaging session.

10. A computer program product comprising a computer usable storage medium that is not a transitory signal per se, having computer usable program code stored thereon for generating a unified transcript for a multi-modal conversation, the computer usable program code, when executed on a computer hardware device, causing the computer hardware device to perform the operations of:
    establishing a single instant messaging session between two conversants;
    receiving text messages as part of a conversation between the two conversants, through the single instant messaging session;
    embedding in the instant messaging session a voice message received from one of the two conversants;
    classifying each one of the embedded voice message and the received text messages by type, the type of message being one of a voice message and a text message;
    determining if the one of the voice and text messages is classified as a voice message; and,
    logging the classified voice and text messages in a single transcript of conversation between the two conversants occurring in the single instant messaging session in response to determining that the one of the received voice and text messages is classified as a voice message.

11. The computer program product of claim 10, further comprising
    switching the conversation between a voice messaging session and a text messaging session.

12. The computer program product of claim 10, wherein the logging comprises chronologically displaying each one of the classified voice and text messages in the single instant messaging session between the two conversants.

13. The computer program product of claim 10, wherein the logging comprises storing each one of the classified voice and text messages in a single transcript log file between the two conversants.

14. The computer program product of claim 10, wherein the logging comprises chronologically ordering each one of the classified voice and text messages in the single transcript.

15. The computer program product of claim 10, wherein the logging comprises username ordering of each one of the classified voice and text messages in the single transcript.

16. The computer program product of claim 10, wherein the logging comprises displaying each one of the classified voice and text messages by username order in the single instant messaging session between the two conversants.

* * * * *

(12) INTER PARTES REVIEW CERTIFICATE (3090th)

United States Patent
Jones et al.

(10) Number: US 9,760,865 K1
(45) Certificate Issued: Apr. 11, 2023

(54) MULTI-MODAL TRANSCRIPT UNIFICATION IN A COLLABORATIVE ENVIRONMENT

(75) Inventors: Angela Richards Jones; Ruthie D. Lyle

(73) Assignee: GINEGAR LLC

Trial Number:

IPR2022-00542 filed Feb. 15, 2022

Inter Partes Review Certificate for:

Patent No.: 9,760,865
Issued: Sep. 12, 2017
Appl. No.: 11/839,944
Filed: Aug. 16, 2007

The results of IPR2022-00542 are reflected in this inter partes review certificate under 35 U.S.C. 318(b).

INTER PARTES REVIEW CERTIFICATE
U.S. Patent 9,760,865 K1
Trial No. IPR2022-00542
Certificate Issued Apr. 11, 2023

AS A RESULT OF THE INTER PARTES REVIEW PROCEEDING, IT HAS BEEN DETERMINED THAT:

Claims 1-16 are cancelled.

\* \* \* \* \*